United States Patent
Zimmer et al.

(10) Patent No.: US 7,656,574 B2
(45) Date of Patent: Feb. 2, 2010

(54) METHOD AND DEVICE FOR REDUCTION OF POLARIZATION-DEPENDENT EFFECTS IN A TUNABLE OPTICAL COMPONENT

(75) Inventors: Even Zimmer, Horten (NO); Vladimir Kartashov, Horten (NO); Trond Naterstad, Nykirke (NO); Gunner E. Hedin, Tyreso (SE); Bengt Jacobson, Stockholm (SE)

(73) Assignee: Photonyx AS, Horten (NO)

( * ) Notice: Subject to any disclaimer, the term of this patent is extended or adjusted under 35 U.S.C. 154(b) by 0 days.

(21) Appl. No.: 12/047,218

(22) Filed: Mar. 12, 2008

(65) Prior Publication Data
US 2008/0165410 A1 Jul. 10, 2008

Related U.S. Application Data

(63) Continuation of application No. 11/368,280, filed on Mar. 3, 2006, now abandoned, which is a continuation of application No. PCT/NO2004/000261, filed on Sep. 3, 2004.

(30) Foreign Application Priority Data
Sep. 5, 2003 (NO) .................................. 20033940

(51) Int. Cl.
*G02B 26/00* (2006.01)
(52) U.S. Cl. ........................ 359/295; 359/238; 359/245

(58) Field of Classification Search ............... 359/295, 359/238, 245, 246, 247, 248, 252, 254, 259
See application file for complete search history.

(56) References Cited

U.S. PATENT DOCUMENTS

| 3,527,522 | A |   | 9/1970 | Baumgartner |
| 4,278,327 | A | * | 7/1981 | McMahon et al. .......... 349/197 |
| 6,476,987 | B1 | * | 11/2002 | Kleinschmidt et al. ...... 359/837 |

FOREIGN PATENT DOCUMENTS

| GB | 2 265 024 A | 9/1993 |
| NO | 2002 4265 | 9/2002 |
| WO | WO 01/011419 A3 | 2/2001 |
| WO | WO 02/082166 A2 | 10/2002 |
| WO | WO 2004/023197 A | 3/2004 |

OTHER PUBLICATIONS

The International Search Report for PCT/NO2004/000261, mailed on Dec. 12, 2004.

* cited by examiner

*Primary Examiner*—Timothy J Thompson
(74) *Attorney, Agent, or Firm*—Knobbe Martens Olson & Bear LLP

(57) ABSTRACT

A device and a method for reducing polarization-dependent effects in dynamical optical components based on surface modulation of a polymer gel or membrane is disclosed. The device and method modifies, removes or leads away unwanted reflections from incident light or information carrier communicating with said optical component.

18 Claims, 6 Drawing Sheets

METHOD AND DEVICE FOR REDUCTION OF POLARIZATION-DEPENDENT EFFECTS IN A TUNABLE OPTICAL COMPONENT

RELATED APPLICATIONS

This application is a continuation of U.S. application Ser. No. 11/368,280, filed Mar. 3, 2006, entitled "Method and Device for Reduction of Polarization-Dependent Effects in a Tunable Optical Component," which is a continuation of PCT application PCT/NO2004/000261, filed Sep. 3, 2004, in English, which claims priority to Norwegian application No. 20033940, filed Sep. 5, 2003, which are incorporated herein by reference.

BACKGROUND OF THE INVENTION

1. Field of the Invention

The present invention relates generally to a device and a method for reducing polarization-dependent effects in dynamical optical components based on surface modulation of a polymer gel or membrane, and specially to a device and method that modifies, removes or leads away unwanted reflections from incident light or information carrier communicating with said optical component.

2. Description of the Related Technology

The high cost of components, in particular for the more advanced components including many subparts, is slowing down the deployment of optical communication systems and the introduction of all-optical networks. Consequently, it is necessary to develop cost effective components that have the necessary specifications, but allow low-cost assembly and production methods to be used.

Dynamic or tunable components are of particular demand in fiber optic communication systems and the modules that such systems comprise. A performing, low-cost, and highly scalable dynamic optical component based on surface modulation of a polymer gel (or membrane) is documented in the Norwegian patent application no. 2002 4265.

The state of polarization of the light in an optical communication system fluctuates over time due to environmental effects on the system components (especially the optical fiber) and changes in the topography of the system. The performance of both the individual components and the modules that the system is built from, should therefore be as independent of the polarization state of the incoming light as possible, and change the polarization state as little as possible. These requirements ensure maximum transmission distance, maximum rate of information that can be transferred, and maximum number of nodes that can be passed in a network.

Several optical systems have been suggested for tunable diffraction gratings with applications to fiber optical components. One of the known methods is diffractive MEMS (D-MEMS) from companies like Light Connect and Silicon Light Machines.

These devices are based on a moveable diffraction grating consisting of at least two separate pieces. There are provided a stationary reflective bottom surface, and a moveable set of thin blades, the grating, that are made of etched silicon. The blades can be moved up and down by the application of an appropriate electrical field. The result is a diffraction grating, where the effective phase shift of the grating is given by the relative position of the blades and the reflective surface below. This arrangement can be used to make effective variable optical attenuators, but the set of blades must be processed out of silicon. This is an expensive process, and the yield of the process goes dramatically down as the system size increases. Components made from D-MEMS are hence effective and performing, but expensive.

U.S. Pat. No. 3,527,522 discloses a light-modulating device comprising a glass prism attached with a reflection free glass backing plate, a transparent electrode and a deformable material such as silicon rubber. A substrate with addressable electrodes is arranged in parallel with the surface of said deformable silicon rubber with an air gap between the material and the substrate.

SUMMARY OF CERTAIN INVENTIVE ASPECTS

One aspect is a method of manufacturing a dynamical optical component having reduced polarization-dependent effects. The method includes attaching a gel layer or membrane adjacent to a surface of a transparent prism, forming a set of individually addressable electrodes on a substrate, where the electrodes are spaced apart from a surface of the gel or membrane and facing away from the prism, and providing means for minimizing difference in effects on orthogonal states of polarization in incoming light or information carrier by locating the means inside the optical component in a path of the incoming light or the information carrier.

Another aspect is an optical component including a gel layer or membrane attached adjacent to a surface of a transparent prism, and a substrate with a set of individually addressable electrodes spaced apart from a surface on the gel or membrane facing away from the prism, where the surface of the transparent prism is diffuse.

Another aspect is a method of using an optical component. The method includes providing incident light to the optical component, directing the incident light to at least one of a gel layer and a membrane attached adjacent to a diffuse surface of a transparent prism, and spaced apart from a substrate with a set of individually addressable electrodes spaced apart from the surface, and minimizing a difference in effects on orthogonal states of polarization in the incident light.

Tunable Diffraction Grating Technology

Certain embodiments described herein have at least the performance of D-MEMS solutions, but with similar or better ease of manufacturing as found in LCD or LCOS methods of production. Some embodiments are based on tunable surface diffraction gratings. Examples of such gratings have been disclosed in the literature and in patents. For example, our preferred embodiment is based on the arrangements described in Norwegian patent application no. 2002 4265.

In order to compensate for limitations caused by the materials or processes involved in the manufacturing and assembly, we propose a method and device according to the present invention that will reduce the polarization-dependent effects in tunable diffraction grating devices and systems as seen for example in the Norwegian patent application no. 2002 4265.

DETAILED DESCRIPTION OF CERTAIN INVENTIVE EMBODIMENTS

Certain embodiments provide minimization of the difference in effects on orthogonal states of polarization in the incoming light or information carrier on dynamic optical components as exemplified in the Norwegian patent application no. 2002 4265, where optical tuneability is achieved by surface modulation of a polymer gel film or membrane.

Double- or Multi-Pass Configurations Including Half-Waveplate

In an example of one embodiment, inserting a half-wave plate half-way or close to half-way in the optical path through the polymer-based or membrane based modulator is provided. A half-wave plate is known to a person skilled in the art. The effect of a half-wave plate is to rotate orthogonal polarizations 90° in the plane transversal to the direction of propagation. If the polarization effects in the light path before and after the half-waveplate are similar or close to identical, orthogonal polarizations will in total see the same or similar polarization effects (polarization dependent loss, polarization mode dispersion, etc.). The resulting effect is that the modulator will have no effects depending on the polarization state of the incoming light, and a minimal change in polarization state will take place.

Figure 1A:
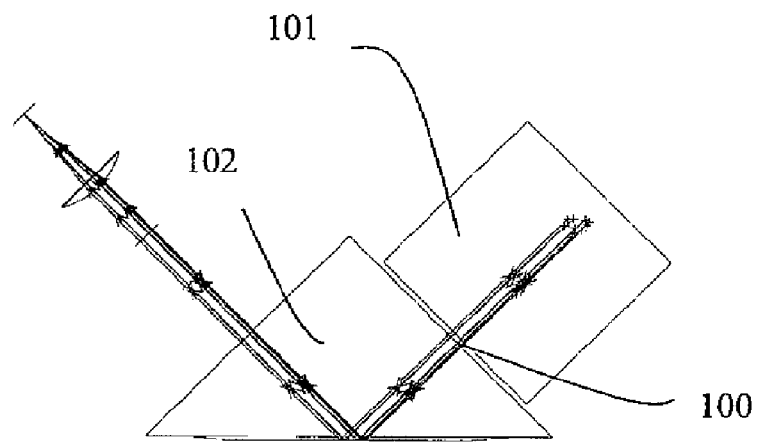
FIGS. 1a and 1b illustrate an example of a double pass embodiment with a single channel.
Figure 1B:
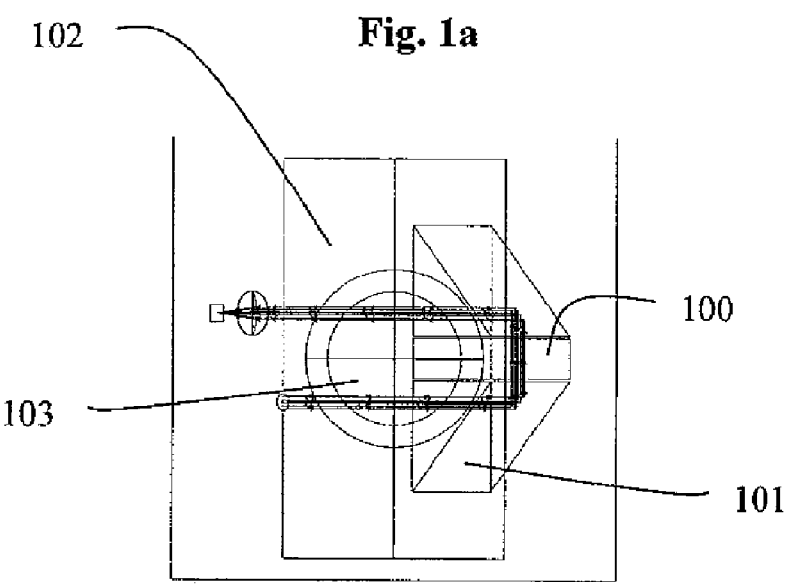

An example of such a single-pass embodiment can be found in FIG. 1a and FIG. 1b. FIG. 1a illustrates an end view while FIG. 1b illustrates a top view of the embodiment. There are two prisms 101 and 102 joined adjacent to one another with a half-wave plate 100 in between the joining prism surfaces. In FIG. 1b the gel surface (or membrane) is indicated as a circle 103.

A half-wave plate 100 can be both of transmissive and reflective nature. Both types can be exploited in examples of embodiments.

Figure 2:
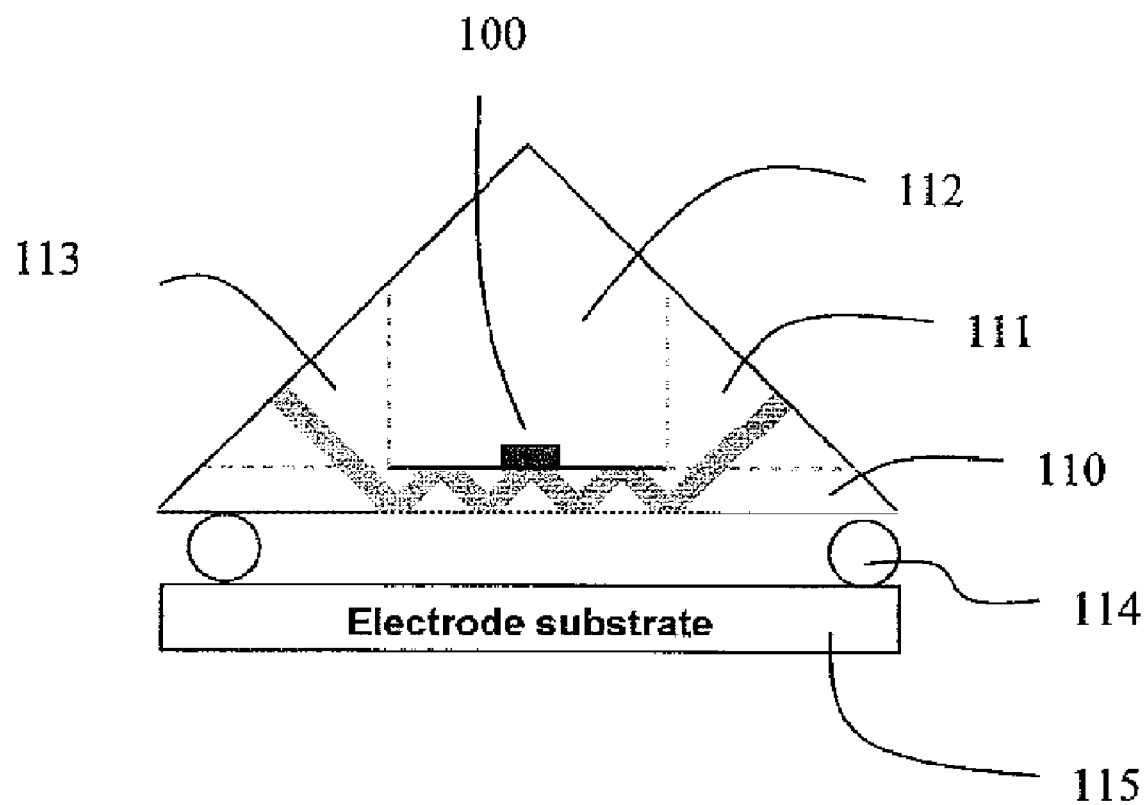
FIG. 2 illustrates an example of a multipass embodiment.

The light or information carrier may also hit the modulated gel (or membrane) surface more than twice. An example of a multiple-pass configuration with four reflections from the modulated gel (or membrane) surface and a half-waveplate 100 included is shown in FIG. 2.

In this example embodiment, the distance between the diffractions is very small and the Fresnel approximation is used. An interesting effect of the multiple reflections is that the gel amplitude can be n times lower and approximately the electrical field can be n times smaller while keeping a high dynamic attenuation range.

In this example embodiment, the half-wave plate is arranged inside a prism arrangement comprising 4 different joining prism shapes 110, 111, 112 and 113 where the prism part 112 comprises a carving for the halfwave-plate 100. The different parts are joined as illustrated in FIG. 2. A substrate 115 with electrodes constituting the modulating electric field is adjacent to the gel or membrane part of the optical component, spaced apart by the distal members 114.

Reduction or Suppression of Residual Resonance Effects

A small residual polarization effect may occur due to the non-normal incidence of light on the prism-polymer (or membrane) interface if the index matching between prism and polymer (membrane) is not sufficiently optimized.

Figure 3:
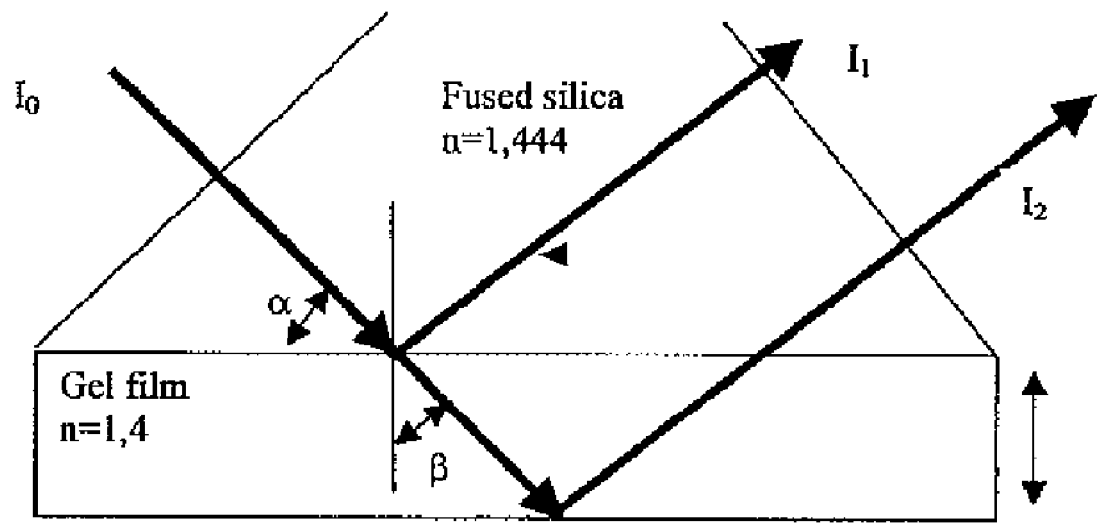
FIG. 3 illustrates how reflections can provide interference effects.

The state of polarization of the incoming light can be decomposed into two components, one component parallel to (known as p-polarization) and the other perpendicular to (known as s-polarization) the plane of incidence. The plane of incidence is defined by the incoming ray direction and the perpendicular to the prism-gel (membrane) interface. If the difference Dn in refractive index between the gel (membrane) as indicated in FIG. 3 where only a part of the complete modulator as described in the Norwegian patent application no. 2002 4265 is included. The thickness of the ITO layer applied between the prism end the gel (membrane) in the patent application mentioned above is typically only a fraction of a wavelength and has therefore less influence.

A standard text book gives the formulae necessary to study the polarization effects during reflection and refraction, see chapter 1.5, pp. 38-53 in 7th edition of 'Principles of Optics' by Max Born and Emil Wolf, Cambridge University Press.

If the difference $\Delta n$ in refractive index between the gel (membrane) and the prism is very small, say $\Delta n=0.044$ as indicated in FIG. 3, it can be found that for an incident angle of 45°, the intensity reflection coefficient $R_s$ for s-polarized light may be roughly 10-3 while the reflectivity for p-polarized light may be roughly three orders of magnitude smaller.

Incoming coherent light in s-polarization with intensity $I0$ will experience two major reflections as indicated in FIG. 3: An intensity component $I_1$ is reflected from the prism-gel interface with reflection coefficient $R_s$ in the order of $10^{-3}$. A larger component $I_2$ is reflected by the surface pattern on the gel set up by the electrical field from the electrodes as described above. The reflective coefficient for reflected light in zero'th order is $\chi$.

The interference effects between $I_1$ and $I_2$ will result in a wavelength dependence in the output signal similar to what is observed in the output from the well-known Fabry-Perot cavity where the so-called effective free spectral range (FSR) is given by the angle of incidence and the gel (or membrane) thickness. The oscillations in the wavelength response will have an amplitude of $2\sqrt{(I_1 I_2)} \approx 2 I_0 \sqrt{(R_s \chi)}$. For a desired attenuation of 10 dB, the amplitude of the wavelength variations will be about 1 dB.

In other examples of embodiments, the so-called finesse of the Fabry-Perot cavity is reduced. In examples of embodiments this is done by:

1. Making the prism-gel (membrane) interface non-flat (scatter the reflected light $I_1$)
2. Making the prism-gel (membrane) surface slightly non-parallel to the gel-air gap surface (or membrane-gap).
3. Introducing a curvature in one or both surfaces.
4. Introducing antireflection coating at prism-polymer (membrane) interface.
5. Modifying refractive index of either prism. Polymer (membrane) or both, 1. Partly Scattering Prism-gel (Membrane) Interface By introducing a surface wave-front error $\Delta\phi$ in the gel-prism (membrane) interface the reflected beam $I_1$ will experience a wave-front phase error of $\Delta\phi_1=2\Delta\phi$ and the transmitted beam a wave-front phase error of $\Delta\phi_2=2(n_{prism}-n_{gel})\Delta\phi$. Since the difference in refractive index between the gel (membrane) and prism is typically very small, say 0.044, the reflected beam $I_1$ will suffer a factor of 20 more from the surface wave-front phase error. It is therefore possible to attenuate or scatter the reflected beam while only slightly perturbing the zero'th order transmitted beam. Three of the possible methods according to the invention are:

1. Stop the polishing process of the prism before optical quality is reached
2. Chemical etching of polished prism surface
3. Post-scratching of already polished prism surface 2 and 3. Non-parallel or Curved Gel (Membrane) Surfaces Non-parallel prism-gel (membrane) and gel-air (membrane) surface or a curvature of one or both gel (membrane) surfaces can be made during the manufacturing process. The effect is that the $I_1$ component mentioned above will not be reflected in a direction parallel to $I_2$, but rather spread out as a non-collimated beam.

Figure 4:
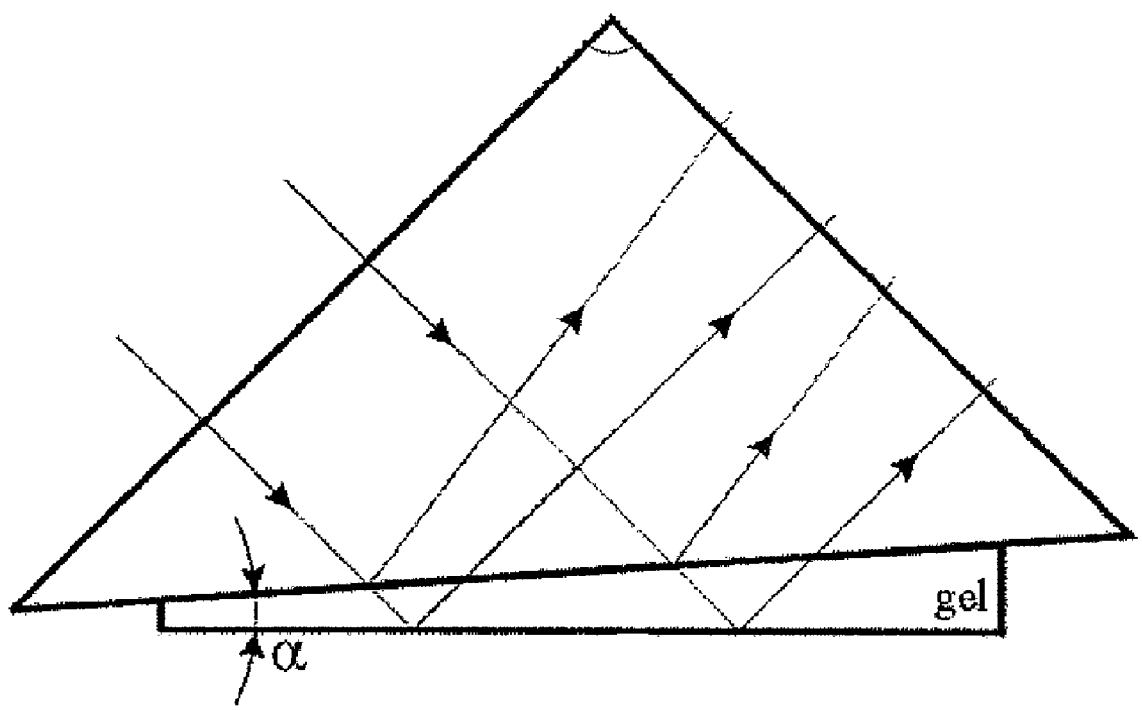
FIG. 4 illustrates another example of an embodiment.

A possible solution is to shape the gel (or membrane) during manufacturing so that the resulting layer is wedge-shaped in stead of having parallel surfaces. An example is given in FIG. 4. A typical range for the angle cc shown in FIG. 4 can be from a tenth of a degree up to close to one degree, depending of the characteristics of the optics at the output of the modulator.

Figure 5:
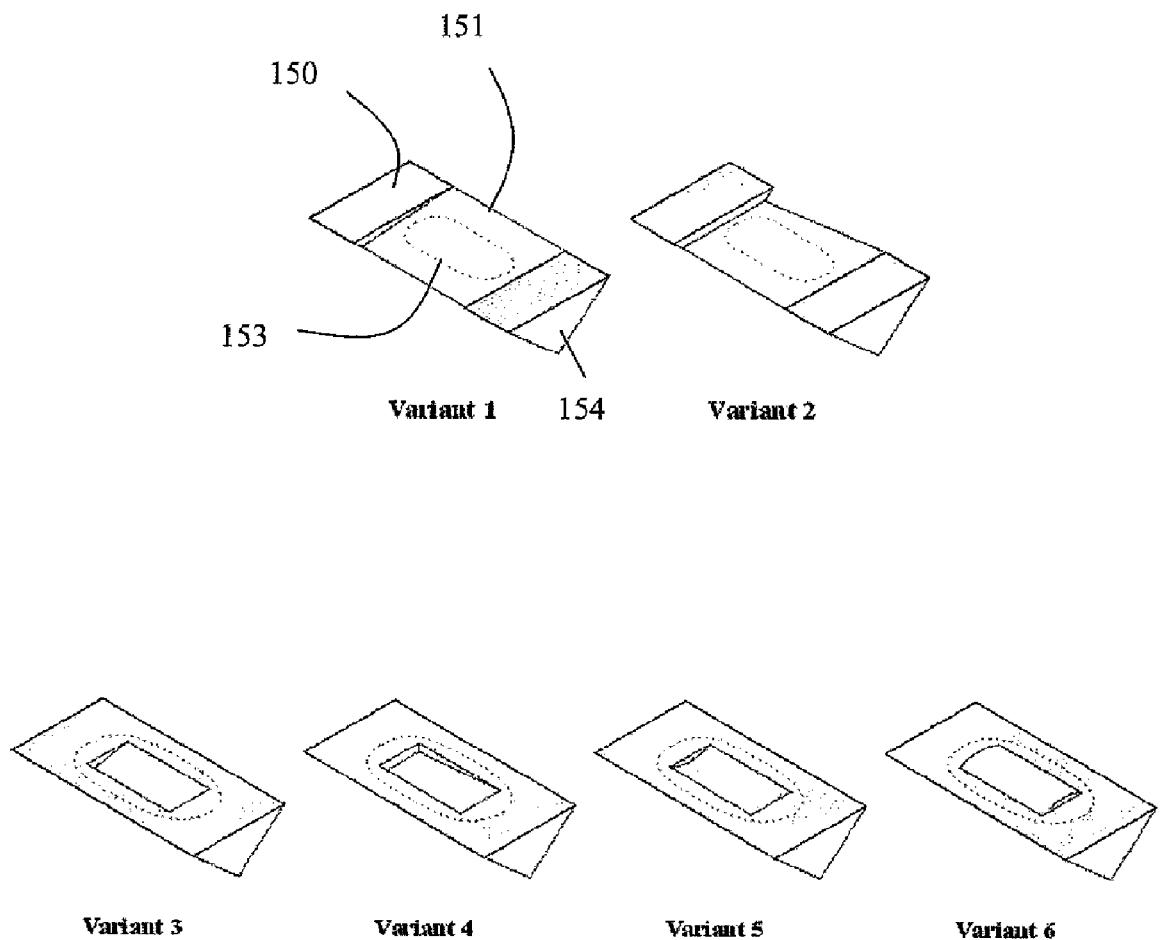
FIG. 5 illustrates examples of prism design according to an example of embodiment.

Non-parallel gel surfaces (membranes) can also be achieved by a modified prism shape, and by joining the modified prism to the surface of the gel (or membrane) thereby forming the desired non-parallel shape of the gel surface. Examples of six possible prism designs are shown in FIG. 5. The gel or membrane surface can easily be made flat during the manufacturing process, and it is preferable to introduce either a slope or some kind of a concave or a convex type of shape of the prism surface that will be joining the gel, and thereby forming the desired shape. The slope or convex or concave shape can be 1 or 2 dimensional. In a variant 1 of prism design as shown in FIG. 5, a prism 154 has a surface 150 formed with a wedge shaped section 151. A gel or membrane adjacent surface is indicated by the dotted line 153. Variant 2 in FIG. 5 illustrates that the slope of the wedge shaped section can be in any desired direction relative to the prism surface 150. Variant 3, 4, 5 and 6 illustrates how a wedge shaped section can be formed as a carving on the surface 150 of the prism 154.

In yet another example, both a wedge shaped section and a half-wave plate is provided in one and same optical component.

4. Introducing Antireflection Coating at Prism-polymer (Membrane) Interface

Figure 6:
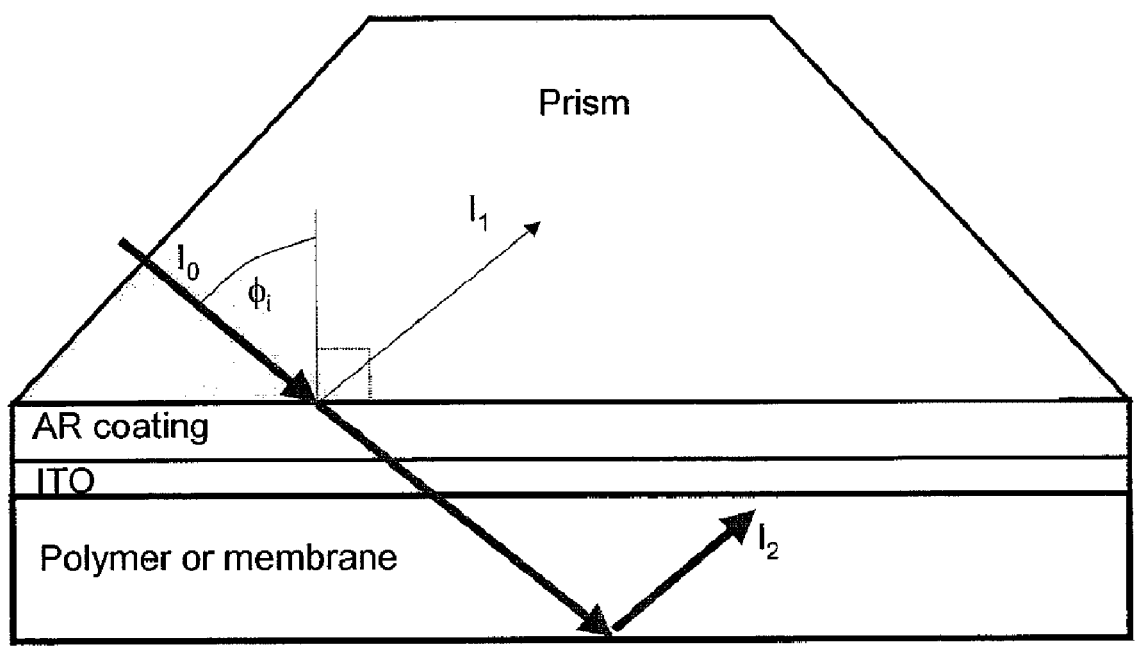
FIG. 6 illustrates an example of a prism design according to another example of an embodiment.

In one embodiment, one or several additional layer or layers (normally referred to as an anti-reflection coating or AR-coating) can be added between the surface of the prism and the ITO-layer that is next to the polymer film, see FIG. 6. The thickness of the ITO layer is typically only a fraction of a wavelength and has therefore less influence. The AR coating is designed so that its refractive index is in the range between the refractive indices of the prism and the polymer film (membrane). This will reduce the effective reflectivity seen by s- and p-polarized light when leaving the prism and entering the polymer film. The intensity of the ray labeled $I_1$ will be lowered compared to the case when there is no AR coating present.

In yet another embodiment the refractive index of the ITO-layer could be modified in order to serve as an AR coating or a material that could act both as a bias electrode and an AR-coating could be used instead of the ITO.

5. Modifying Refractive Index of Either Prism, Polymer (Membrane) or Both

The difference in the refractive indices of the prism and the polymer (membrane) may be reduced by modifying one or both of the indices. This can be done by adding suitable dopants to the respective materials during manufacturing.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An optical component comprising:
   a gel layer or membrane attached to a surface of a transparent prism, the gel layer or membrane and the surface configured to attenuate or scatter light so as to modulate light of orthogonal polarization substantially similarly; and
   a substrate with a set of individually addressable electrodes spaced apart from a surface on said gel or membrane facing away from said prism,
   wherein the gel layer or membrane and the surface is diffuse.

2. An optical component comprising:
   a gel layer or membrane attached to a surface of a transparent prism, the gel layer or membrane and the surface configured to attenuate or scatter light so as to modulate light of orthogonal polarization substantially similarly; and
   a substrate with a set of individually addressable electrodes spaced apart from a surface on said gel or membrane facing away from said prism,
   wherein said surface of said transparent prism comprises a half wave plate disposed in a cavity in said surface of said transparent prism.

3. An optical component comprising:
   a gel layer or membrane attached to a surface of a transparent prism, the gel layer or membrane and the surface configured to attenuate or scatter light so as to modulate light of orthogonal polarization substantially similarly; and
   a substrate with a set of individually addressable electrodes spaced apart from a surface on said gel or membrane facing away from said prism,
   wherein said gel or membrane is substantially wedge shaped.

4. An optical component comprising:
   a gel layer or membrane attached to a surface of a transparent prism, the gel layer or membrane and the surface configured to attenuate or scatter light so as to modulate light of orthogonal polarization substantially similarly; and
   a substrate with a set of individually addressable electrodes spaced apart from a surface on said gel or membrane facing away from said prism,
   wherein at least one of the gel layer or membrane and the prism comprises a dopant affecting a reflective index of the at least one of the gel layer or membrane and the prism.

5. The optical component of claim 1, wherein the gel layer or membrane and the surface are configured to modulate light based on an electric field from the electrodes.

6. The optical component of claim 1, wherein said surface of said transparent prism comprises a half-wave plate disposed in a cavity in said surface of said transparent prism.

7. The optical component of claim 1, wherein said gel or membrane is substantially wedge shaped.

8. The optical component of claim 1, wherein said surface of said prism is substantially anti-reflective.

9. The optical component of claim 1, wherein at least one of the gel layer or membrane and the prism comprises a dopant affecting a reflective index of the at least one of the gel layer or membrane and the prism.

10. The optical component of claim 2, wherein the gel layer or membrane and the surface are configured to modulate light based on an electric field from the electrodes.

11. The optical component of claim 2, wherein said gel or membrane is substantially wedge shaped.

12. The optical component of claim 2, wherein said surface of said prism is substantially anti-reflective.

13. The optical component of claim 2, wherein at least one of the gel layer or membrane and the prism comprises a dopant affecting a reflective index of the at least one of the gel layer or membrane and the prism.

14. The optical component of claim 3, wherein the gel layer or membrane and the surface are configured to modulate light based on an electric field from the electrodes.

15. The optical component of claim 3, wherein at least one of the gel layer or membrane and the prism comprises a dopant affecting a reflective index of the at least one of the gel layer or membrane and the prism.

16. An optical component comprising:

a gel layer or membrane attached to a surface of a transparent prism, the gel layer or membrane and the surface configured to attenuate or scatter light so as to modulate light of orthogonal polarization substantially similarly; and a substrate with a set of individually addressable electrodes spaced apart from a surface on said gel or membrane facing away from said prism, wherein said surface of said prism is substantially anti-reflective, and wherein said gel or membrane is substantially wedge shaped.

17. An optical component comprising:

a gel layer or membrane attached to a surface of a transparent prism, the gel layer or membrane and the surface configured to attenuate or scatter light so as to modulate light of orthogonal polarization substantially similarly; and a substrate with a set of individually addressable electrodes spaced apart from a surface on said gel or membrane facing away from said prism, wherein said surface of said prism is substantially anti-reflective, and wherein at least one of the gel layer or membrane and the prism comprises a dopant affecting a reflective index of the at least one of the gel layer or membrane and the prism.

18. The optical component of claim 4, wherein the gel layer or membrane and the surface are configured to modulate light based on an electric field from the electrodes.

* * * * *